April 25, 1967 M. S. HACKER 3,315,396

POCKET TELEPHONE ATTACHMENT

Filed April 30, 1965

INVENTOR.
MARSHALL S. HACKER
BY HIS ATTORNEYS
HARRIS, KIECH, RUSSELL & KERN

United States Patent Office
3,315,396
Patented Apr. 25, 1967

3,315,396
POCKET TELEPHONE ATTACHMENT
Marshall S. Hacker, 12013 Thermo St.,
Los Angeles, Calif. 90066
Filed Apr. 30, 1965, Ser. No. 452,303
10 Claims. (Cl. 40—336)

Many telephone numbers are frequently used and it is troublesome to search through large telephone directories prior to each usage thereof. Other numbers such as emergency numbers are of such importance that they must be more quickly obtainable than is possible by use of the typical directory. To facilitate location of such numbers, it is frequently desirable to maintain them on a relatively short list or single page near the telephone.

Accordingly, it is an object of this invention to provide a pocket telephone attachment which is attachable to any conventional desk-type telephone and which will carry a page or several pages of telephone numbers or other information. Such a pocket telephone attachment is particularly advantageous for recording numbers for long distance dialing and for the new seven digit numbers which are generally more difficult to remember than the old word prefix and five digit numbers.

Another object of this invention is to provide a pocket telephone attachment which is normally substantially concealed beneath the telephone and which is not subject to inadvertent removal from the telephone.

Another object of this invention is to provide a pocket telephone attachment which is easily removable from beneath the telephone. Removal is facilitated by the provision of means which avoid the application of torque to the pocket telephone attachment when outwardly directed removing forces are applied thereto.

It is a particular object of this invention to provide a pocket telephone attachment which is magnetically secured to the metal baseplate of a telephone.

A further object of this invention is to provide a pocket telephone attachment which is constructed of inexpensive materials and which is quickly and easily fabricated.

Briefly stated, the objects of this invention may be accomplished by providing a thin envelope having a transparent upper face and an opposed lower face, the envelope having at least one aperture through which a memo or card carrying telephone numbers may be inserted. Magnetic means are secured to one of the faces of the envelope and a tab extends outwardly from one edge of the envelope, the tab being positioned generally centrally of the magnetic means to avoid the application of torque to the envelope is response to the exertion of outwardly removing forces on the tab. Such structure is adapted for use with a desk-type telephone having the usual metal baseplate facing downwardly and spaced vertically from a supporting surface by a plurality of dependiing feet, the space between the baseplate, the supporting surface, and two adjacent feet defining an elongated opening through which the pocket telephone attachment may be inserted. Insertion of the pocket telephone attachment through the elongated opening causes the magnetic means to releasably secure the envelope to the metal baseplate. The tab which extends outwardly from one edge of the envelope protrudes through the elongated opening beyond the perimeter of the telephone to provide exposed gripping surfaces to which a force may be applied to remove the envelope from the baseplate.

The invention, both as to its organization and method of operation, together with further objects and advantages thereof, may best be understood by reference to the following description taken in connection with the accompanying drawing.

Figures 1, 4:
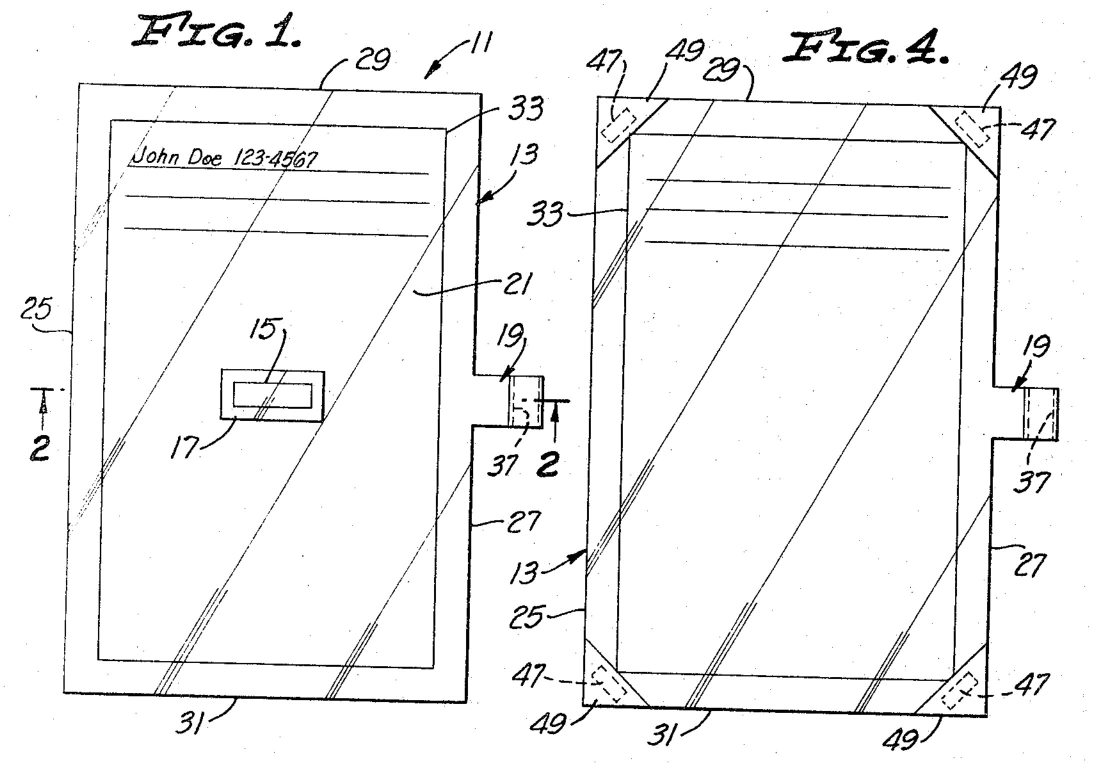
FIG. 1 is a plan view of a pocket telephone attachment constructed in accordance with the teachings of this invention.
FIG. 4 is a second embodiment of a pocket telephone attachment.
Figure 2:
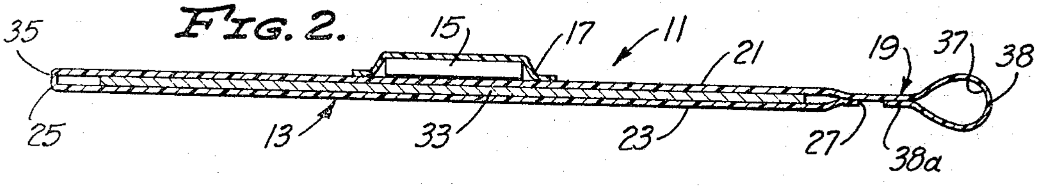
FIG. 2 is a sectional view taken along line 2—2 in FIG. 1.

Referring to FIGS. 1 and 2 of the drawing, a pocket telephone attachment 11 includes an envelope 13, magnetic means 15, means 17 for securing the magnetic means to the envelope, and a tab 19. The envelope 13 is thin, flat and rectangular, is constructed of plastic material, and has a rectangular transparent upper face 21 and an opposed rectangular lower face 23. The envelope 13 has two opposed longitudinal edges 25 and 27 and two opposed transverse edges 29 and 31, the length of the transverse edges being no greater than the length of the longitudinal edges. One edge, preferably the transverse edge 31 is open to receive a memo 33 having various printed matter such as telephone numbers thereon, the printed matter being visible through the transparent face 21. Alternatively, access to the interior of the envelope 13 may be obtained through an opening in one of the faces 21 and 23.

The envelope 13 may be constructed by providing a fold 35 along the longitudinal edge 25 and heat seals along the transverse edge 29 and the longitudinal edge 27 leaving the transverse edge 31 open to receive the memo 33. Preferably the lower face 23 is also transparent so that printed matter on the lower side of the memo 33 will also be visible therethrough.

The magnet 15 which is in the form of a rectangular solid having rounded edges is generally centrally positioned on the outer surface of the upper face 21 substantially equidistant from the longitudinal edges 25 and 27 and from the transverse edges 29 and 31. The longitudinal axis of the magnet 15 is preferably generally parallel to the transverse edges 29 and 31. As the pocket telephone attachment 11 and the memo 33 are not heavy, the magnet 15 may be very small covering only a very small portion of the upper face 21 and extending upwardly a very slight distance from the face 21. For clarity, the drawing exaggerates the size of the magnet 15 relative to the size of the envelope 13.

The securing means or pocket 17 is provided for securing the magnet 15 to the upper face 21. The pocket 17 includes a small strip of plastic, preferably transparent plastic, heat sealed along its edges or adhesively secured to the upper or outer surface of the upper face 21. Although the pocket 17 may allow some sliding movement of the magnet 15 relative to the upper face 21, it substantially confines such movement and serves to hold or secure the magnet contiguous to or closely adjacent the upper face. Alternatively, the pocket 17 could be provided on the outer or lower surface of the lower face 23; however, to facilitate insertion of the memo 33 into the envelope 13, it is preferred not to locate the pocket and the magnet on the inner surface of either the upper or lower face. Various adhesives may be employed in addition to or in lieu of the pocket 17 to secure the magnet 15 to the envelope 13.

The tab 19 is secured to the envelope 13 to avoid the application of torque to the envelope about the magnet 15 in response to outwardly directed removing forces on the tab. That is, the tab 19 is positioned equidistant from the transverse edges 29 and 31 so that when forces tending to move the envelope 13 to the right are applied to the tab, no moment is applied to the envelope about the magnet. The tab 19 may be integral with or secured to either or both the upper face 21 and the lower face 23, and is generally perpendicular to and extends outwardly from the longitudinal edge 27. The tab 19 may be relatively narrow and preferably extends generally parallel to the transverse edges 29 and 31. By constructing the tab 19 integral with and of the same material as the envelope 13, fabrication is facilitated; however, it is also possible to attach a cardboard or metal tab to the plastic envelope 13 or to sandwich the tab between the faces 21 and 23 at the edge 27. The tab 19 has a loop 37 at the outer end thereof into which a pencil may be inserted for retention adjacent the envelope 13, the loop being formed by a fold 38 and a heat seal 38*a*.

The pocket telephone attachment 11 is adapted for use with a desk-type telephone 39 (FIG. 3) having a conventional generally horizontal metal baseplate 40 spaced vertically from a supporting surface 41 by a plurality of depending feet 43, the space between the baseplate, the supporting surface, and two adjacent feet defining an elongated opening 45. The base plate 40 has the usual surface irregularities. The envelope 13 containing the memo 33 is thin and of a size to be insertable through the elongated opening 45. By grasping the tab 19, the entire pocket telephone attachment 11 may be slid or inserted through the elongated opening 45 so that the magnet 15 is brought sufficiently close to the metal baseplate 40 to be drawn thereto. The magnet 15 releasably secures the envelope 13 to the baseplate 40 but slides along the baseplate upon the application of slight forces to the tab 19. To facilitate such sliding, the upper surface of the magnet 15 is preferably flat.

Figure 3:
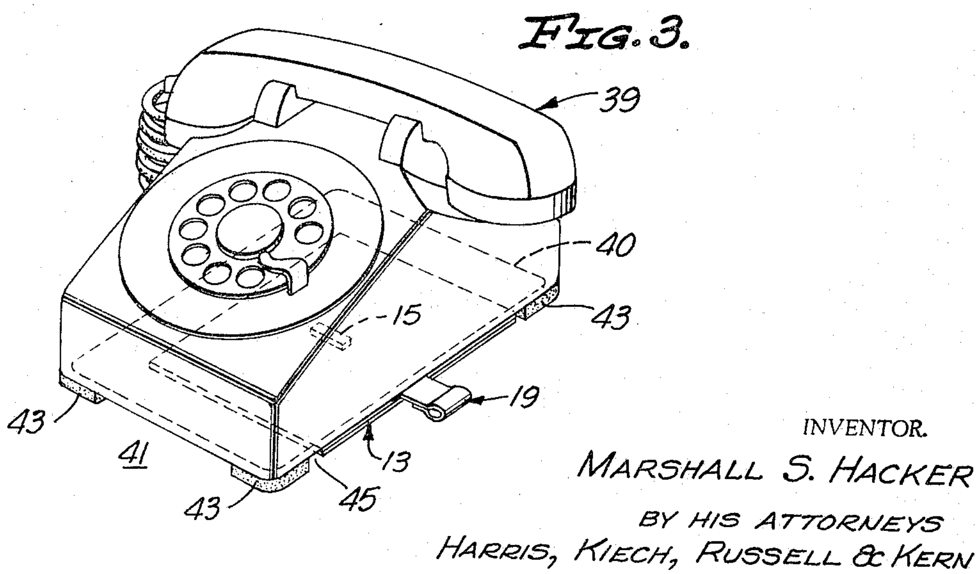
FIG. 3 is a perspective view showing the pocket telephone attachment releasably secured to the baseplate of a telephone.

The magnet 15 is operative to perform its function as a releasably securing means whether the face 21 on which it is mounted faces upwardly or downwardly when the envelope 13 is beneath the baseplate 40. With the envelope 13 properly releasably secured to the baseplate 40, the tab 19 will preferably extend outwardly through the elongated opening 45 and beyond the perimeter of the telephone as shown in FIG. 3. Because the tab 19 is positioned generally centrally of the magnet 15, normal removing forces applied to the tab 19 will tend to draw the envelope 13 directly through the elongated opening 45 without causing turning or twisting of the envelope about the magnet 15. Thus, the envelope 13 may be quickly and easily withdrawn from its concealed position beneath the telephone 39.

The composite structure including the envelope 13 and the memo 33 should be sufficiently rigid to allow insertion through the opening 45 and to withstand the forces necessary to draw the envelope along the metal baseplate 40 against the retarding action of the magnet 15. Extremely flimsy plastics are not preferred unless the memo 33 is of a substantially rigid material. Accordingly, in order that the envelope 13 may be used with memos of varying rigidity, it is preferred to construct the envelope of a plastic material having sufficient rigidity to withstand the forces of normal usage without undue bending.

FIG. 4 illustrates another embodiment of a pocket telephone attachment constructed in accordance with the teachings of this invention. Except for the location and the number of magnets provided, it is identical with the embodiment shown in FIGS. 1 and 2, and, accordingly, corresponding elements are designated by corresponding reference numerals. In lieu the single magnet 15 centrally located on the envelope 13, the embodiment of FIG. 4 has four identical magnets 47, one being positioned at each of the four corners of the rectangular envelope. The lonigtudinal axis of the magnets 47 form angles of about 45 degrees with the edges of the envelope. Because four magnets 47 are used, each of them may be even smaller than the magnet 15, and each is secured at its respective corner by a pocket 49. Each of the pockets 49 is formed from a small generally triangular patch of heat sealable plastic material which is heat sealed along its edges to the upper surface of the upper face 21. As in the embodiment of FIGS. 1 and 2, the magnets 47 could be secured to the upper face 21 by a suitable adhesive. Also as in the prior embodiment, the tab 19 is positioned substantially equidistant between the transverse edges 29 and 31 and also equidistant between the two magnets 47 which are adjacent the longitudinal edge 27.

The embodiment of FIG. 4 may be employed with the telephone 39 in the same manner as the prior embodiment. It has the advantages of providing additional holding power and also of providing the magnet adjacent the edges of the envelope 13 so that they do not tend to cover written matter on the memo 33.

It should be understood that either or both of the faces 21 and 23 may be transparent and that the magnets 15 and 47 may be secured on either of these faces. If desired, the bottom face 23 may be constructed of a relatively rigid plastic and the upper face may be constructed of a relatively flexible or even flimsy plastic so that the composite structure will possess sufficient rigidity for its intended purposes.

By utilizing an upper face which is sufficiently flexible, it will conform to the surface irregularities of the conventional baseplate when the pocket telephone attachment 11 is magnetically secured thereto.

Various changes, modifications, and substitutions may be made by those having ordinary skill in the art without departing from the spirit and scope of this invention.

What is claimed is:

1. A pocket telephone attachment for holding a memo and adapted for use with a telephone having a metal baseplate spaced vertically from a supporting surface by a plurality of depending feet, the space between the baseplate, the supporting surface, and two adjacent feet defining an elongated opening, said pocket telephone attachment comprising:

an envelope of a size to be insertable into the elongated opening and having a transparent upper face and an opposed lower face, said envelope having at least one aperture through which the memo may be inserted, the memo being visible through said transparent upper face when it is in said envelope;

magnetic means;

means for securing said magnetic means to at least one of said faces, insertion of said envelope through the elongated opening causing said magnetic means to releasably secure said envelope to said metal baseplate; and a tab secured to said envelope for moving said envelope through the opening, said tab extending outwardly from one edge of said envelope through the opening and beyond the perimeter of the telephone when said envelope is magnetically secured to the baseplate, said tab being secured to said envelope generally centrally of said magnetic means to avoid the application of torque to said envelope about said magnetic means in response to exertion of outwardly directed removing forces on said tab.

2. A pocket telephone attachment as defined in claim 1 wherein said magnetic means is a single magnet and said tab is disposed directly outwardly therefrom.

3. A pocket telephone attachment as defined in claim 1 wherein said magnetic means includes a plurality of magnets and said means for securing includes pockets on said one of said faces for securing said magnets to said envelope.

4. A pocket telephone attachment as defined in claim 1 wherein said tab has a loop formed in the outer end thereof.

5. A pocket telephone attachment for holding a memo and adapted for use with a telephone having a metal baseplate spaced vertically from a supporting surface by a plurality of depending feet, the space between the baseplate, the supporting surface, and two adjacent feet defining an elongated opening, said pocket telephone attachment comprising:

a plastic rectangular envelope of a size to be insertable into the elongated opening and having a transparent upper face and an opposed lower face, said rectangular envelope having a pair of opposed longitudinal edges and a pair of opposed transverse edges, the length of said transverse edges being no greater than the length of said lognitudinal edges, one of said edges being open to receive the memo, the memo being visible through said transparent upper face when it is in said envelope;

a magnet substantially evenly spaced between said transverse edges;

means for securing said magnet to one of said faces, insertion of said envelope through the elongated opening causing said magnet to releasably secure said envelope to said metal baseplate; and a tab for moving said envelope through the opening and secured to said envelope substantially equidistant from one of said pairs of edges, said tab extending outwardly from one edge of the other of said pairs of edges through the opening and beyond the perimeter of the telephone when said envelope is magnetically secured to the baseplate.

6. A pocket telephone attachment as defined in claim 5 wherein said magnet is secured to said transparent upper face.

7. A pocket telephone attachment as defined in claim 5 wherein said means for securing includes a pocket formed on said one of said faces.

8. A pocket telephone attachment for holding a memo and adapted to be releasably secured to a metal baseplate of a telephone, comprising:

a thin plastic rectangular envelope having a transparent upper face and an opposed lower face, said rectangular envelope having two opposed longitudinal edges and two opposed transverse edges, the length of said transverse edges being no greater than the length of said longitudinal edges, one of said transverse edges being open to receive the memo, the memo being visible through said transparent face when it is in said envelope, the other of said transverse edges and at least one of said longitudinal edges being heat sealed;

a single magnet generally centrally positioned on said transparent face;

a pocket on said envelope for securing said magnet to the outer surface of said upper transparent face, said magnet being adapted to magnetically secure said envelope to the baseplate of the telephone; and a tab for moving said envelope secured to said envelope substantially equidistant from said transverse edges, said tab being generally perpendicular to and extending outwardly from one of said longitudinal edges and beyond the perimeter of the telephone when said envelope is magnetically secured to the baseplate.

9. A pocket telephone attachment for holding a memo and adapted to be releasably secured to a metal baseplate of a telephone comprising:

a thin plastic rectangular envelope having a transparent upper face and an opposed lower face, said rectangular envelope having two opposed longitudinal edges and two opposed transverse edges, the length of said transverse edges being no greater than the length of said longitudinal edges, one of said transverse edges being open to receive the memo, the memo being visible through said transparent upper face when it is in said envelope, the other of said transverse edges and at least one of said longitudinal edges being heat sealed;

four magnets positioned at the four corners of said rectangular envelope;

a pocket at each corner of said envelope for securing said magnets to said transparent upper face, said magnets being adapted to releasably secure said envelope to the metal baseplate of the telephone; and a tab for moving said envelope secured to said envelope about equidistant between said transverse edges, said tab extending outwardly from one of said longitudinal edges and beyond the perimeter of the telephone when said envelope is magnetically secured to the metal baseplate.

10. A pocket telephone attachment as set forth in claim 9 wherein said lower face is constructed of relatively rigid plastic and said transparent upper face is constructed of relatively flexible plastic.

References Cited by the Examiner

UNITED STATES PATENTS

| | | | |
|---|---|---|---|
| 2,541,270 | 2/1951 | Mitnick | 40—336 |
| 2,582,562 | 1/1952 | Rice | 40—336 X |
| 3,083,493 | 4/1963 | Malachuk | 281—15 |
| 3,237,327 | 3/1966 | Griggs | 40—10 |

EUGENE R. CAPOZIO, *Primary Examiner.*

W. H. GRIEB, *Assistant Examiner.*